United States Patent Office 3,799,751
Patented Mar. 26, 1974

3,799,751
MOTOR FUEL ADDITIVES
Donald R. Lachowicz and George S. Saines, Fishkill, Malvin J. Michelson, Poughkeepsie, and George W. Eckert, Wappingers Falls, N.Y., assignors to Texaco Inc., New York, N.Y.
No Drawing. Filed May 19, 1972, Ser. No. 255,122
Int. Cl. C10l 1/22
U.S. Cl. 44—62                                    7 Claims

ABSTRACT OF THE DISCLOSURE

Fuel compositions, and particularly motor fuel compositions, to which are added minor amounts of nitro-ketonized olefin polymers and amine salts thereof for the purpose of providing such properties as rust protection, and carburetor de-icing.

BACKGROUND OF THE INVENTION

It is conventional to employ additives in gasoline which provide rust protection and carburetor anti-icing properties. A certain amount of moisture will always be present in the pipe lines and in the cargo or storage tanks in which gasoline is held before the point of consumption. Rust or corrosion inhibitors are essential to prevent rusting and the subsequent contamination of the fuel. Anti-icing agents are important to prevent or reduce the incidence of carburetor stalling due to icing under certain atmospheric conditions. While many of these types of compounds are known, efforts continue to develop improved additives for these purposes.

SUMMARY OF THE INVENTION

It is a primary object of this invention to provide a fuel composition which exhibits excellent corrosion inhibition and anti-icing propertes.

Various other objects and advantages of the invention will be readily apparent from the following detailed description thereof.

We have discovered a fuel composition which provides excellent corrosion inhibition and anti-icing properties. These improved properties are directly attributable to the presence in the hydrocarbon-based fuel of a minor amount of nitro-ketonized polymer or amine salt thereof, as hereinafter defined.

DESCRIPTION OF THE PREFERRED EMBODIMENTS

Broadly, this invention contemplates a motor fuel composition comprising a mixture of hydrocarbons in the gasoline boiling range and a minor amount of a nitro-ketonized polymer or amine salt thereof.

The polymers which may be utilized in the preparation of the novel additives of this invention must exhibit unsaturation and are selected from the group consisting of homopolymers of olefin monomers and copolymers of two or more of the olefin monomers with each other.

Thus, any such olefin polymers are applicable, it being required that the resulting polymer retain sufficient unsaturation for the subsequent nitro-ketonization reaction. Thus, for nitro-ketonization to occur the unsaturation must have at least one hydrogen attached to each olefinic carbon atom. (i.e., —CH=CH₂ or —CH=CH—R).

The nitro-ketonization reaction generally proceeds according to the following equation, as illustrated by the derivation of 1,2-polybutadiene:

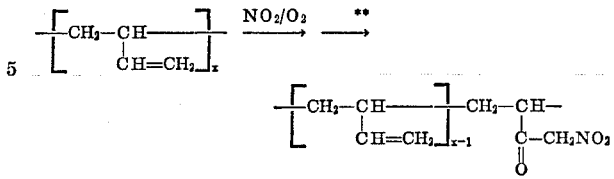

Actually, this is a two stage process wherein the peroxy nitrate is produced in the first stage.

Thus, the nitro-ketonized polymers are prepared by contacting the olefin polymer simultaneously with dinitrogen tetroxide and oxygen in the first stage at a temperature of from about —35 to 45° C., and preferably from about —10 to 30° C. Air can be employed as the source of oxygen or oxygen can be provided in admixture with inert gases such as nitrogen or argon. Under preferred conditions, oxygen and dinitrogen tetroxide are respectively introduced into the reaction zone containing the polymer at a rate of between 1 and 16 milliliters per minute of oxygen per gram of polymer and between about 0.0001 and 0.02 gram of dinitrogen tetroxide per minute per gram of polymer. Atmospheric and higher pressures may be employed and the reaction is conveniently conducted in the presence of inert organic solvents having from 4 to 22 carbon atoms exemplified by hydrocarbons including paraffins such as pentane, hexane, octane, decane, dodecane, octadecane; cycloparaffins such as cyclopentane and cyclohexane; and aromatic hydrocarbons such as benzene and toluene. In general, reaction times of about one-half to ten hours are employed, the time related to the rate of addition of the dinitrogen tetroxide. Other solvents that can be used are ether and CCl₄, but indications are that products made in CCl₄ are not effective rust inhibitors.

It is to be noted that the dinitrogen tetroxide employed is actually an equilibrium mixture of dinitrogen tetroxide and nitrogen dioxide with the equilibrium being driven to essentially 100 percent dinitrogen tetroxide at 0° C. and essentially 100 percent nitrogen dioxide at 140° C. at 1 atmosphere pressure.

When internal unsaturation is present in the polymer, i.e. unsaturation on other than a terminal carbon atom, the reaction yields a mixture of two isomeric vicinal nitro-ketonized functions

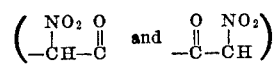

When unsaturation occurs between the terminal and adjacent carbon atoms, nitration occurs on the terminal carbon atom and keto-nization occurs on the carbon atom vicinal thereto.

The denitrating agent is added to the reaction mixture in the second stage at a temperature of from —35 to 45° C. and in a ratio of agent (mole): reacted polymer unsaturation (equivalents) ranging from about 1:1 to 40:1, with the preferred range being from about 2:1 to 30:1. Specific examples of denitrating agents include dimethylformamide, diethylformamide, dimethylacetamide, dimethylsulfoxide, diethylsulfoxide, tetramethylurea, tetraethylurea, and the like.

As previously indicated, the degree of nitro-ketonization attained can be controlled by the relative amounts of polymer, dinitrogen tetroxide and oxygen used. For purposes of this invention, the nitro-ketonization of at least one unsaturation per 3,000 molecular weight units of the polymer will enable the resulting derivatized polymer to exhibit satisfactory fuel additive properties.

Although the above described nitro-ketonization procedure is preferred for purposes of this invention due to its autogenous nitro-ketone formation at the point of unsaturation, other known processes are equally applicable. For example, oxidation of a β-nitro alcohol.

While the nitro-ketonized polymers exhibit excellent fuel additive properties, tests have also indicated that the amine salts of nitro-ketonized polypropylene provide improvement in such properties as rust protection, and carburetor de-icing. The amine salts can be prepared by merely reacting the desired amine with the nitro-ketonized polymer. The reaction is conveniently conducted at temperatures ranging from about 5 to 45° C. and in the presence of an inert organic solvent including paraffins such as pentane, hexane, octane, and decane; cycloparaffins such as cyclohexane; and aromatic hydrocarbons such as benzene and toluene.

The amines which may be reacted with the nitro-ketonized polymer include primary, secondary or tertiary amines; mono- or polyamines; and aliphatic, aromatic, alicyclic or heterocyclic amines. Specific examples of each of these groups include:

| Amine salt of polypropylene: | Property improved |
| --- | --- |
| Morpholine | Rust protection. |
| 2,6-dimethyl morpholine | Do. |
| Duomeen O [1] | Carburetor anti-icing. |
| Duomeen C [2] | Do. |
| Duomeen S [3] | Do. |
| 1:1 Morpholine: Duomeen C | Rust protection; fair for carburetor anti-icing. |

[1] Duomeen O is a $C_{18}$ alkenyl propylene diamine.
[2] Duomeen S is a $C_{15}$ alkenyl propylene diamine.
[3] Duomeen S is a $C_{18}$ alkenyl propylene diamine.

While the relative concentrations of amine and polymer will generally be based on the stoichiometric equivalencies of the reaction, it should be noted that amine salts which reflect only partial aminization of the nitro-ketone groups are also applicable for use as fuel additives.

The base fuel of the invention comprises a mixture of hydrocarbons boiling in the gasoline boiling range. This base fuel may consist of straight chain or branched chain paraffins, cycloparaffins, olefins and aromatic hydrocarbons or any mixture of these. This fuel can be derived from straight run naphtha, polymer gasoline, natural gasoline or from catalytically cracked or thermally cracked hydrocarbons and catalytically reformed stocks. The composition of the base fuel is not critical nor does the octane level of the base fuel have any material effect on the invention. Any conventional motor fuel base may be employed in the practice of this invention. The base fuel may contain any of the additives normally employed in a motor fuel. For example, the base fuel may contain an anti-knock compound, such as a tetraalkyl lead compound including tetraethyl lead, tetramethyl lead, tetrabutyl lead, mixtures thereof and the like. The tetraethyl lead mixture commercially available for automotive use contains an ethylene chloride-ethylene bromide mixture as a scavenger for removing lead from the combustion chamber in the form of a volatile lead halide. The motor fuel may also contain any of the conventional fuel additives including phenolic or amine antioxidants, metal deactivators, anti-icing additives, upper cylinder lubricants, lead appreciators, alcohols, pour depressants, corrosion inhibitors, dyes, and the like.

In general, effective detergent motor fuels are produced by adding from about 0.0001 to 0.2 weight percent of the nitro-ketonized polymer or amine salt to the gasoline. A preferred concentration of the nitro-ketonized polymer or amine salt is in the range from about 0.001 to 0.1 weight percent which corresponds to about 3 to 300 PTB (pounds of additive per 1000 barrels of fuel).

It should be noted that the fuel additives may be utilized individually or as blends combining more than one nitro-ketonized polymer and/or amine salt. The use of such blends enables the practitioner to take advantage of the primary areas of improvement exhibited by the components of the blend.

While primary emphasis in this specification has been placed on additives for motor fuels, it should also be noted that the various additives of this invention may also be utilized in jet fuels, furnace oils, diesel fuels, and the like to provide improvements in rust protection, thermal stability and storage stability.

The following examples will further illustrate the embodiments of this invention.

EXAMPLE I

This example illustrates a typical nitro-ketonization reaction applicable for use in this invention and the improved fuel additive properties exhibited by the resulting nitro-ketonized product.

To a solution of 25.4 grams of 1,2-polybutadiene (molecular weight of 5,000 to 10,000) in 640 ml. of toluene, there was added simultaneously oxygen at a rate of 60 milliliters per minute and dinitrogen tetroxide at a rate of $3.4 \times 10^{-4}$ moles per minute for 115 minutes at 0° C. After the 115 minute period, 2.4 milliliters of liquid dinitrogen tetroxide (sufficient to react 8% of the available double bonds) had been transferred to the reaction flask and the solution was purged with oxygen for about 30 minutes. Dimethylformamide (80 ml.) was then added to the reaction solution at —10° C. over a 5 minute period. Sodium bicarbonate was added and the mixture stirred for 5 minutes at room temperature to remove by-product nitric acid. The sodium bicarbonate was removed by gravity filtration. Infra-red spectroscopic analysis of the isolated product obtained from a similar run showed the presence of nitro and carbonyl functions.

The base fuel which was utilized to test the properties of the nitro-ketonized 1,2-polybutadiene was a winter grade gasoline consisting of about 34% aromatic, 9% olefinic and 57% paraffinic hydrocarbons and boiled in the range of about 90–377° F. It had a research octane number of about 102.7 and contained about 2.86 cc. of tetraethyl lead per gallon.

Gasoline blends were then prepared consisting of the above base fuel mixed with specified amounts of the nitro-ketonized fuel additive. These gasoline blends as well as a sample of the base fuel and a blend of the base fuel with the underivatized 1,2-polybutadiene were then subjected to the following performance tests:

ACCELERATED RUST TEST

The anti-rusting properties of motor fuels were determined by inserting and thoroughly wetting a cold-rolled steel strip into a tall form four ounce glass bottle containing 90 cc. of the fuel sample and adding 20 cc. of distilled water. The bottle was stoppered, agitated for 15 seconds and stored at room temperature for 24 hours. The strip was thereafter visually inspected and the percentage of rusted surface area estimated.

COLONIAL PIPELINE RUST TEST

A steel spindle, 3 3/16 inches long and 1/2 inch wide, made from ASTM D–665–60 steel polished with Crystal Bay fine emery paper, is used in the Colonial Pipeline Rust Test. The spindle was placed in a 400 cc. beaker with 300 cc. of fuel sample, which was maintained at 100° F. for one-half hour. Then 30 cc. of distilled water were added. The beaker and contents were kept at 100° F. for 3 1/2 hours. The spindle was thereafter visually inspected and the percentage of rusted surface area was estimated.

CARBURETOR ICING TEST

The anti-icing properties of the additive-containing fuel of the invention were determined in a carburetor icing demonstrator apparatus consisting of a vacuum pump equipped so that cool moisture-saturated air from an ice tower is drawn through a sample glass tube gasoline carburetor. The gasoline sample is placed in a sample bottle and is drawn into the glass carburetor through a 20 gage hypodermic needle. Evaporation of the gasoline in the gas tube further cools the cold moist air with resulting ice formation on the throttle plate. The formation of ice on the throttle plate causes an engine to stall and it has been found that this condition is equivalent to a pressure drop across the throttle plate of about 0.5 inch, and 0.9 inch of mercury and the time required to reach this pressure drop is noted. The vacuum pump is adjusted to give a vacuum of 1.8 inches of mercury and the test is run until either a pressure of 2.3 inches mercury has been reached or the run has continued for 300 seconds. Since, with most fuels, this pressure drop is reached in 1 to 4 minutes, 300 seconds is the maximum time for a run. An effective carburetor anti-icing fuel additive is judged on basis of comparison with a blank (base fuel), since the level of numbers from this test tend to vary somewhat. The results of these tests are presented in the following table.

| Additive | Percent nitro-ketonization | Amount of additive (PTB) | Accelerated rust test (percent rust) | Colonial pipeline rust test (percent rust) | Carburetor icing test (seconds) 0.5″ Hg | 0.9″ Hg |
|---|---|---|---|---|---|---|
| Nitro-ketonized 1,2-polybutadiene | 8 | 32 | 0 | (a) | 199 | 243 |
| Do | 8 | 16 | 0-5 | (a) | 163 | 194 |
| Do | 8 | 8 | 0-5 | 5 | 103 | 120 |
| Do | 8 | 4 | 5-10 | 20 | 95 | 105 |
| 1,2-polybutadiene | 0 | 32 | 95-100 | 100 | | |
| Blank (base fuel) | 0 | 0 | 80-90 | 100 | 45 | 55 | a Few specks.

The results summarized above clearly indicate the performance improvements resulting from the use of the novel fuel additives of this invention.

EXAMPLE II

A number of different nitro-ketonized polymers were prepared according to the nitro-ketonization procedure described in Example I. The resulting products were then blended with fuel composition and subjected to the test procedures set forth in Example I. The results of these determinations are presented in the following table.

| | Additive | Percent nitro-ketonization | Amount of additive (PTB) | Accelerated rust test (percent) | Carburetor icing test (seconds) 0.5″ Hg | 0.9″ Hg |
|---|---|---|---|---|---|---|
| 1 | Nitro-ketonized 1,2-polybutadiene | 16 | 8 | 5-10 | 300 | 300 |
| 2 | do | 2 | 16 | 0-5 | | |
| 3 | Nitro-ketonized-ethylene-propylene-1,4-hexadiene terpolymer [1] | 100 | 16 | 10-15 | 124 | 132 |
| 4 | Nitro-ketonized polypropene | 100 | 225 | | 82 | 101 |

[1] Mol. wt.: 100,000; 1,4-hexadiene content: about 3 wt. percent.

The data presented hereinabove further indicate the improved properties resulting from the use of a variety of the fuel additives of this invention.

EXAMPLE III

The applicability of amine salts of nitro-ketonized polymers as fuel additives was demonstrated with some amine salts of the nitro-ketonized polypropene polymer described in Example II, hereinabove. The method utilized for preparing these amine salts, as illustrated on morpholine, involved simply mixing the amine (0.07 cc.) and completely nitroketonized polypropylene (0.563 g.) in 1000 cc. of the base fuel described in Example I.

This concentration is equivalent to about 225 pounds of amine salt per 1000 barrels of fuel. The sample was submitted to the performance tests also described in Example I. The results of these determinations are presented in the following table:

| Amine component | Accelerated rust test (percent rust) | Colonial pipeline rust test (percent rust) | Carburetor icing test (seconds) 0.5″ Hg | 0.9″ Hg |
|---|---|---|---|---|
| Morpholine | 5-10 | (a) | 62 | 73 |
| 2,6-dimethyl morpholine | 25-30 | (a) | 43 | 54 |
| Duomeen "O" | 40-50 | 90 | 274 | 279 |
| Duomeen "C" | 30-40 | 40 | 252 | 300 |
| Duomeen "S" | | 50 | 289 | 300 |
| 1:1 blend, by weight, of morpholine: Duomeen "C" | 20-25 | (a) | 177 | 184 |
| Blank (base fuel) | 80-90 | 100 | 41 | 51 | a Few specks.

The results summarized above clearly indicate the improved fuel performance resulting from the use of the amine salt additives of this invention.

Summarizing, this invention is seen to provide novel fuel compositions which exhibit improved performance characteristics as a result of the presence therein of minor amounts of nitro-ketonized olefin polymers and their amine salts.

Variations may be made in proportions, procedures and materials without departing from the scope of the invention as defined by the following claims.

What is claimed is:

1. A motor fuel composition comprising
   (a) a hydrocarbon base fuel suitable for an internal combustion engine comprising a mixture of hydrocarbons giving a mixture having a boiling range within the gasoline boiling range, and
   (b) a small amount effective to provide rust protection and carburetor anti-icing properties of at least one additive selected from the group consisting of nitro-ketonized olefinic polymers and their amine salts, said polymers being selected from the group consisting of polypropylene, polybutadiene, and ethylene-propylene-1,4-hexadiene terpolymer, and said polymers having a molecular weight in the range from 5,000–50,000, and said amine salts being prepared from reacting stoichiometrical amounts of said nitro-ketonized olefinic polymers and $C_{14}$ alkylpropylene diamine or $C_{18}$ alkenylpropylene diamine.

2. A fuel in accordance with claim 1 wherein the additive is a nitro-ketonized ethylene-propylene-1,4-hexadiene terpolymer of 100% nitro-ketonization and is present in an amount up to 300 pounds per thousand barrels of fuel composition.

3. A composition in accordance with claim 1 wherein the fuel contains a nitro-ketonized polybutadiene having about 8% of nitro-ketonization and being present in amount up to about 300 pounds per thousand barrels of fuel composition.

4. A fuel according to claim 1 wherein said fuel contains the stoichiometric $C_{14}$ alkylpropylene diamine salt of nitro-ketonized polybutadiene.

5. A fuel according to claim 1 wherein said fuel contains the stoichiometric $C_{18}$ alkenylpropylene diamine salt of nitro-ketonized polypropylene.

6. A fuel according to claim 5 wherein said fuel contains the stoichiometric $C_{18}$ alkenylpropylene diamine salt of nitro-ketonized ethylene-propylene-1,4-hexadiene terpolymer.

7. The fuel in accordance with claim 1 wherein the additive is an amine salt of a nitro-ketonized polymer wherein the salt forming amine is morpholine and the nitro-ketonized polymer is present in amount up to about 300 pounds per thousand barrels of fuel composition.

References Cited
UNITED STATES PATENTS

| | | | |
|---|---|---|---|
| 2,938,775 | 5/1960 | Siegel | 44—62 |
| 3,222,282 | 12/1965 | Berkowitz et al. | 44—62 |
| 3,251,775 | 5/1966 | Bauer | 44—62 |
| 3,554,897 | 1/1971 | Stanley | 44—62 |
| 3,591,502 | 7/1971 | Ilnyckyj et al. | 44—62 |

DANIEL E. WYMAN, Primary Examiner

Y. H. SMITH, Assistant Examiner

U.S. Cl. X.R.

44—71, 72; 252—390